United States Patent [19]

Edwards et al.

[11] Patent Number: 4,843,351

[45] Date of Patent: Jun. 27, 1989

[54] VECTOR MODULATION SIGNAL GENERATOR

[75] Inventors: Allen P. Edwards, Palo Alto; David R. Gildea, Menlo Park, both of Calif.

[73] Assignee: Hewlett-Packard Company, Palo Alto, Calif.

[21] Appl. No.: 90,624

[22] Filed: Aug. 28, 1987

[51] Int. Cl.[4] .............................................. H03C 5/00
[52] U.S. Cl. ....................................... 332/17; 332/18; 332/21; 332/22; 375/10; 375/39
[58] Field of Search ....................... 332/18, 19, 21, 22, 332/23 R, 17; 375/39, 52–57, 67, 10, 42

[56] References Cited

U.S. PATENT DOCUMENTS

4,006,418  2/1977  Liskov et al. ........................ 332/21 X
4,258,436  3/1981  Campbell ............................... 375/10
4,717,894  1/1988  Edwards et al. .................. 332/18 X

*Primary Examiner*—Siegfried H. Grimm
*Attorney, Agent, or Firm*—William H. F. Howard; Edward Y. Wong

[57] ABSTRACT

A novel vector signal generator is provided which includes a vector modulator controlled by baseband manipulation circuitry. The output signal from the vector modulator is down converted to a desired output frequency. The baseband manipulation circuitry provides, under digital control from, for example, a microprocessor, adjustments to the phase, carrier leakage, and modulation levels of the I and Q signals. In this manner, a highly accurate vector modulated signal is generated within a wide range of carrier frequencies.

20 Claims, 5 Drawing Sheets

VECTOR MODULATION SIGNAL GENERATOR

BACKGROUND

This invention relates to a vector signal generator capable of providing, for example synthesized signal having a frequency range of 10 MHz to 3 GHz, with wideband modulation capabilities, including calibrated scalar, digital, burst, and vector modulation capabilities not available in the prior art signal generators.

Over the last decade, there has been a steady growth in the complexity of modulation employed in Radio Frequency (RF) and microwave systems. Some of the driving forces behind this growth are advances in integrated circuit (IC) technology, the need for more efficient use of bandwidth, availability of wideband and high frequency devices, and the quest for superior system performance in electronic warfare (EW) and radar technologies. Accompanying this growth is the need to generate or simulate these complex modulation signals. Traditional signal generators, with their simple AM and FM modulation capabilities and limited modulation bandwidths, do not meet this need. Up to now the approach taken by test engineers when faced with the task of generating complex modulation is to build their own equipment which is very dedicated, works only over a small range of carrier frequencies and/or data rates, and is difficult to document and maintain, as well as being expensive.

"Vector modulation", sometimes called IQ modulation, refers to the independent modulation of the I (in phase) and Q (quadrature phase) components of a carrier signal. Vector modulation is a very powerful technique because it may be used to generate modulations of any arbitrary phase and magnitude modulation with respect to a reference carrier.

"Scalar modulation" refers to modulation of the carrier signal envelope or amplitude.

"Digital modulation" is a term used in terrestrial and satellite communications to refer to modulation in which digital states are represented by phase and amplitude states of the carrier. Digital modulation is a special case of vector modulation because each modulation state can be decomposed into I and Q components.

"Burst modulation" of a carrier is similar to pulse modulation and may be used to gate the carrier on and off using a burst modulation digital input.

Figures 1, 2, 4:
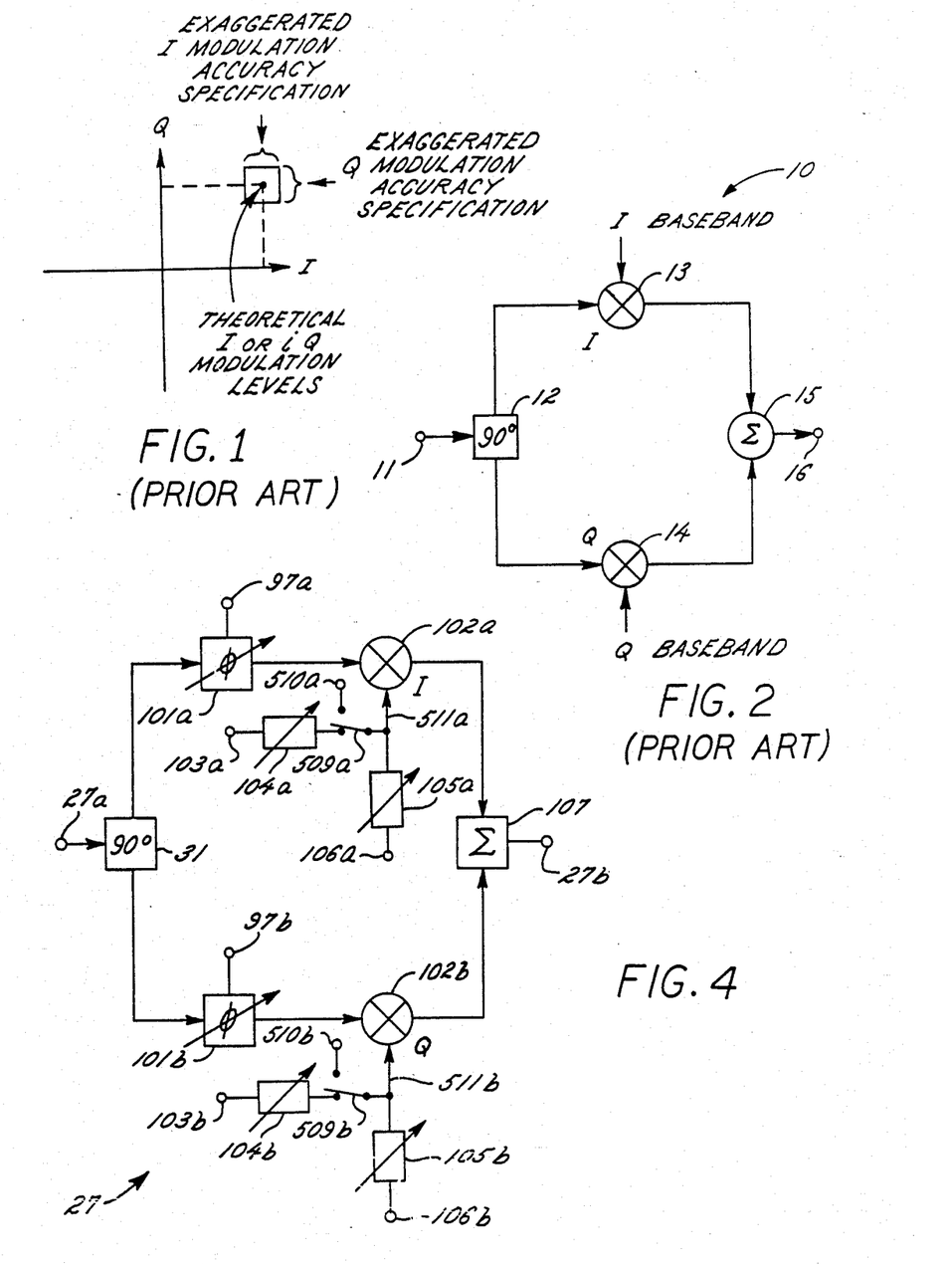
FIG. 1 is a graph depicting a theoretical modulation state of a vector modulated signal, and its accuracy window.
FIG. 2 is a block diagram of a prior art IQ vector modulator.
FIG. 4 is a block diagram of one embodiment an IQ modulator constructed in accordance with the teachings of this invention.

The I or Q "accuracy" is the actual I or Q modulation level produced by the generator compared to the theoretical levels, as shown in FIG. 1.

The I or Q "frequency response" is the flatness of the I or Q modulation level. Since I and Q are measured individually in this measurement, a power meter is a good test instrument.

"Crosstalk" is the modulation that occurs on I when only Q is modulated or vice versa. Crosstalk at modulation rates close to DC are measured as part of the I and Q accuracies as depicted in FIG. 1.

A conceptual block diagram of a typical vector modulator 10 is shown in FIG. 2. A carrier signal of desired frequency is received on input terminal 11, typically from a frequency synthesizer referenced to an oven-stabilized timebase (not shown). When the carrier signal first enters vector modulator 10, it is split into I and Q components, for example, by a 90° hybrid phase shifter 12 well known in the art. The level and phase polarity of each carrier component I and Q is controlled in mixers 13 and 14 by analog baseband signals. The modulated I and Q signals from mixers 13 and 14 are then combined in summing device 15 which is, for example, a summer or combiner well known in the art.

However, while such prior art vector modulators are suitable for use at fixed operating frequencies where harmonics can be filtered from the output signal using fixed frequency filters, such vector modulators are not well suited for use over a wide frequency range.

SUMMARY OF THE INVENTION

In accordance with the teachings of this invention, a novel vector signal generator is provided which includes a vector modulator controlled by baseband manipulation circuitry. The baseband manipulation circuitry provides, under digital control from, for example, a microprocessor, adjustments to the phase, carrier leakage, and modulation levels of the I and Q signals. A highly accurate vector modulated signal is generated within a wide range of carrier frequencies, by allowing the vector modulation to take place at a fixed frequency which is then down converted to the desired output frequency. In this manner, the rather critical vector modulation operation is performed with circuitry which is designed for precise operation at a specific frequency, rather than attempting to perform vector modulation at a wide range of frequencies. However, in order to provide a vector modulated signal within a wide range of desired frequencies, the vector modulated signal is down converted using a low noise frequency synthesizer. Furthermore, automatic calibration is provided in which the output signal, having a frequency within a wide range of possible output frequencies, is analyzed and adjustments made to the vector modulator in order to ensure that highly accurate vector modulation is performed, regardless of the specific modulating signals or the frequency of the down converted output signal. This calibration also allows for relative ease in the manufacturing of the unique vector modulated signal generator of this invention in that precise matching of components and factory adjustments are not needed since the calibration adjustments ensure highly accurate vector modulation.

DETAILED DESCRIPTION

Figure 3:
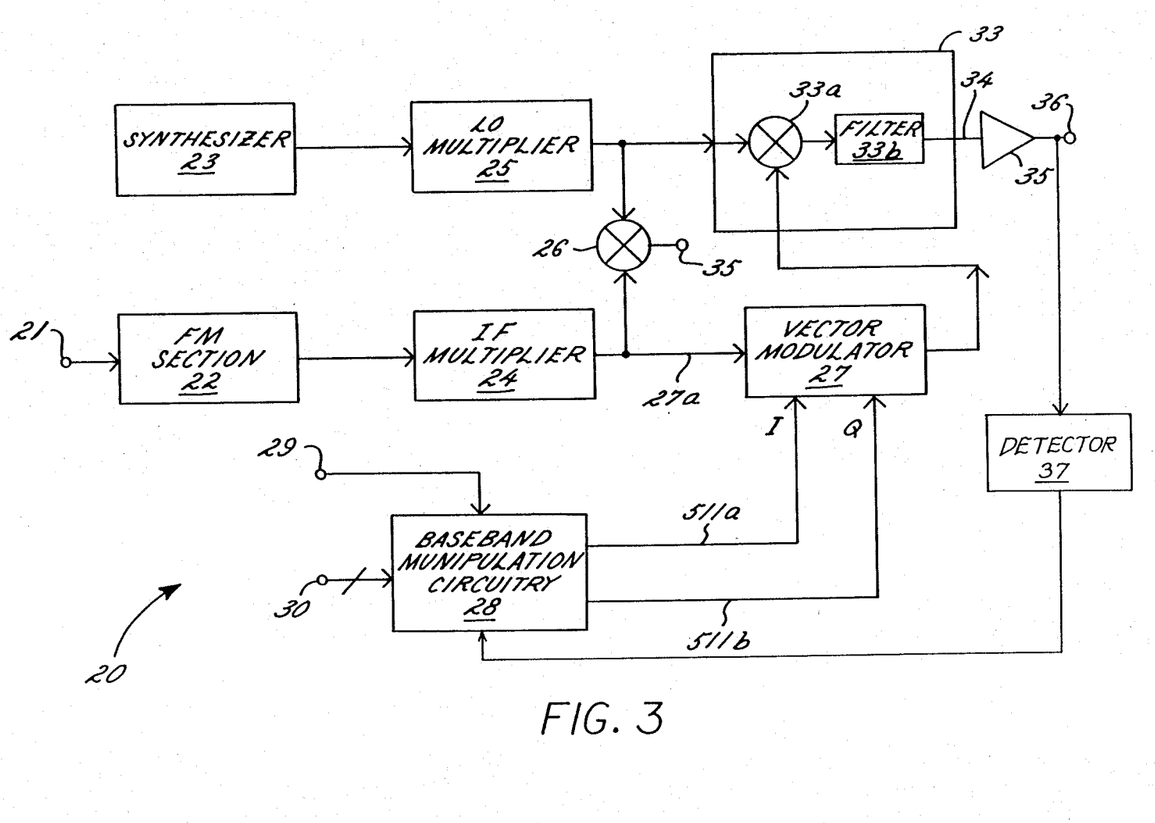
FIG. 3 is a block diagram of one embodiment of a signal generator constructed in accordance with the teachings of this invention.

A block diagram of one embodiment of a vector signal generator constructed in accordance with the teachings of this invention is shown in FIG. 3. Vector modulation is performed by vector modulator 27 on an 8 GHz fixed frequency signal provided by IF multiplier 24. The modulated output signal from vector modulator 27 is then down-converted by output stage 33 which includes mixer 33a to a desired frequency in the 10 MHz to 3 GHz range to provide the RF output signal on output terminal 34. Output stage 33 also includes filter 33b, which is a low pass filter which serves to eliminate spurious components of the output signal available on lead 34. Output amplifier 35 provides an amplified output signal on output terminal 36. The 8.01 GHz to 11 GHz down-conversion signal is provided by local oscillator (LO) multiplier 25, which multiplies by 8 the output signal from synthesizer 23, having a synthesizer output frequency of 1.00125 to 1.37500 GHz. The 8 GHz IF signal is generated by multiplying the 8 the 1 GHz output signal of FM section 22. A separate coherent carrier is provided on output terminal 19 by down-converting the 8 GHz signal from IF multiplier 24, prior to vector modulation, with the 8.01 GHz to 11 GHz signal from LO multiplier 25. The 1 GHz signal from FM section 22 is phase locked to the 10th harmonic of a 100 MHz reference signal from synthesizer 23 in order to provide a highly stable and accurate carrier frequency.

In one embodiment, modulator 27 is an IQ modulator. IQ modulator mixers are inherently very linear, broadband amplitude control elements. The 8 GHz IF for vector modulation provides very wide modulation bandwidth. This IF, being greater than the output frequency, also avoids feed through to the output signal and avoids spurious frequencies in the output signal by allowing relatively simple filtering using low pass filter 33b in output section 33.

The three principal DC errors in a vector modulator are:
1. Carrier leakage—The residual RF output signal when I and Q modulation levels are both set to zero.
2. IQ imbalance—The difference between I and Q modulation levels with modulating input signal having identical amplitudes applied to the I and Q channels.
3. IQ quadrature error—The deviation of the I and Q modulation phases from 90 degrees.

Each of these three effects cause unacceptable errors in I and Q accuracy. To achieve the maximum vector signal accuracy, IQ modulator 27 of this invention is constructed with compensation circuits controlled by baseband manipulation circuitry 28 in response to a detected signal from detector 37. Baseband manipulation circuitry 28 includes, for example, a microcomputer programmed to adjust the compensation circuits so that errors in I and Q accuracy are reduced to a minimum, as is described, for example, in U.S. Patent Application Ser. No. 922,383 filed Oct. 23, 1986 now Pat. No. 4,717,894, on an invention entitled, "Calibration of Vector Modulators Using a Scalar Detector" by Edwards and Gildea.

FIG. 4 depicts one embodiment of an IQ modulator constructed in accordance with this invention which includes compensation circuits controlled by baseband manipulation circuitry 28 of FIG. 3. Carrier leakage is caused by the carrier signal from input terminal 27a leaking through I and Q mixers 102a, 102b. Referring to FIG. 4, these carrier leakage signals are compensated by adding small offsets to the modulation levels of the I and Q channels during calibration by baseband manipulation circuitry 28 (FIG. 3). As shown in FIG. 4, a DC signal is introduced from input terminals 106a and 106b via carrier leakage adjustments 105a and 105b in order to provide a DC level to the I and Q modulation data applied to the I and Q modulation input leads 511a, 511b of modulators 102a and 102b, respectively. In one embodiment, carrier leakage adjustments 105a and 105b are digital to analog converters, which receive a digital offset word from baseband manipulation circuitry 28 (FIG. 3), and provide to the I and Q modulation data the DC levels required to minimize carrier leakage. Under the control of baseband manipulation circuitry 28 (FIG. 3), carrier leakage adjustments 105a and 105b are made in order to minimize carrier leakage in the output signal on terminal 27b, as determined by detector 37 of FIG. 3. A reduction in carrier leakage of typically 40 dB is obtained in this manner.

In a similar manner, amplitude imbalance between I and Q analog modulation signals provided on input leads 103a, 103b is equalized with adjustable analog attenuators 104a and 104b, respectively, controlled by baseband manipulation circuitry 28 (FIG. 3) in response to detector 37 of FIG. 3. Switches 509a and 509b select the amplitude adjusted analog signals from analog attenuators 104a, 104b, or digital information from terminals 510a, 510b, as the modulating signals applied to the I to Q modulation data input leads 511a, 511b of modulators 102a and 102b, respectively.

Also controlled by baseband manipulation circuitry 28 in response to detector 37 of FIG. 3 are microwave phase shifters 101a and 101b, which are adjusted to minimize quadrature error, which results from differences in I and Q signal path lengths in vector modulator 27.

Since both phase and magnitude adjustments are required to calibrate vector modulator 27, a network analyzer might be considered necessary to achieve calibration. However, an algorithm as described in the above-mentioned patent application of Edwards and Gildea is suitable for use in accordance with the teachings of this invention. It uses an amplitude only detector (not shown) for analyzing the amplitude of the output signal of terminal 27b. Since the carrier leakage, IQ imbalance, and IQ quadrature errors are interactive, the algorithm of this invention iterates the adjustments as now described until no further decrease in these errors is achieved.

Carrier leakage consists, in general, of both I and Q components so first I and Q leakages are alternately adjusted (via carrier leakage adjustments 105a, 105b) until the total carrier leakage is minimized. Then the IQ amplitude balance is adjusted (via adjustable analog attenuators 104a, 104b) until the amplitude only detector measures equal levels for the conditions of unit signals applied to I modulation port 103a only and Q modulation port 103b only. IQ quadrature is then adjusted until the equation $$|(+I,+Q)|+|(-I,-Q)|=|(-I,+Q)|+|(+I,-Q)|$$

for the magnitudes of the modulation states is satisfied. The ordered pair (+I,+Q) represents the vector output in the first quadrant of IQ space, as shown in FIG. 1.

Referring again to FIG. 3, all of the phase noise of the 8 GHz and the 8.01 to 11 GHz signals is converted to the output frequency. To get spectral purity that would be acceptable to the 70 MHz user, the 8 GHz and 8.01 to 11 GHz signals must have exceptionally low noise. In accordance with the teachings of this invention, because both signals are derived from the same 100 MHz reference, the multiplied reference noise with about 100 Hz of the carrier is partially canceled in the output down-conversion.

At offsets greater than about 100 Hz from the output signal carrier, synthesizer 23 is the key to the spectral purity of the output signal of the vector signal generator of this invention. Because the phase noise and spurious signals from synthesizer 23 are multiplied by 8 by LO multiplier 25 during conversion to the output frequency, they must be about 18 dB better than required in the output signal to achieve the desired noise performance specification. One embodiment of a low noise synthesizer suitable for use in this invention as synthesizer 23 is taught in U.S. Patent Application Ser. No. 859,096, filed May 2, 1986, now Pat. No. 4,763,083, on an invention of Edwards entitled "Low Phase Noise RF Synthesizer".

Figure 5:
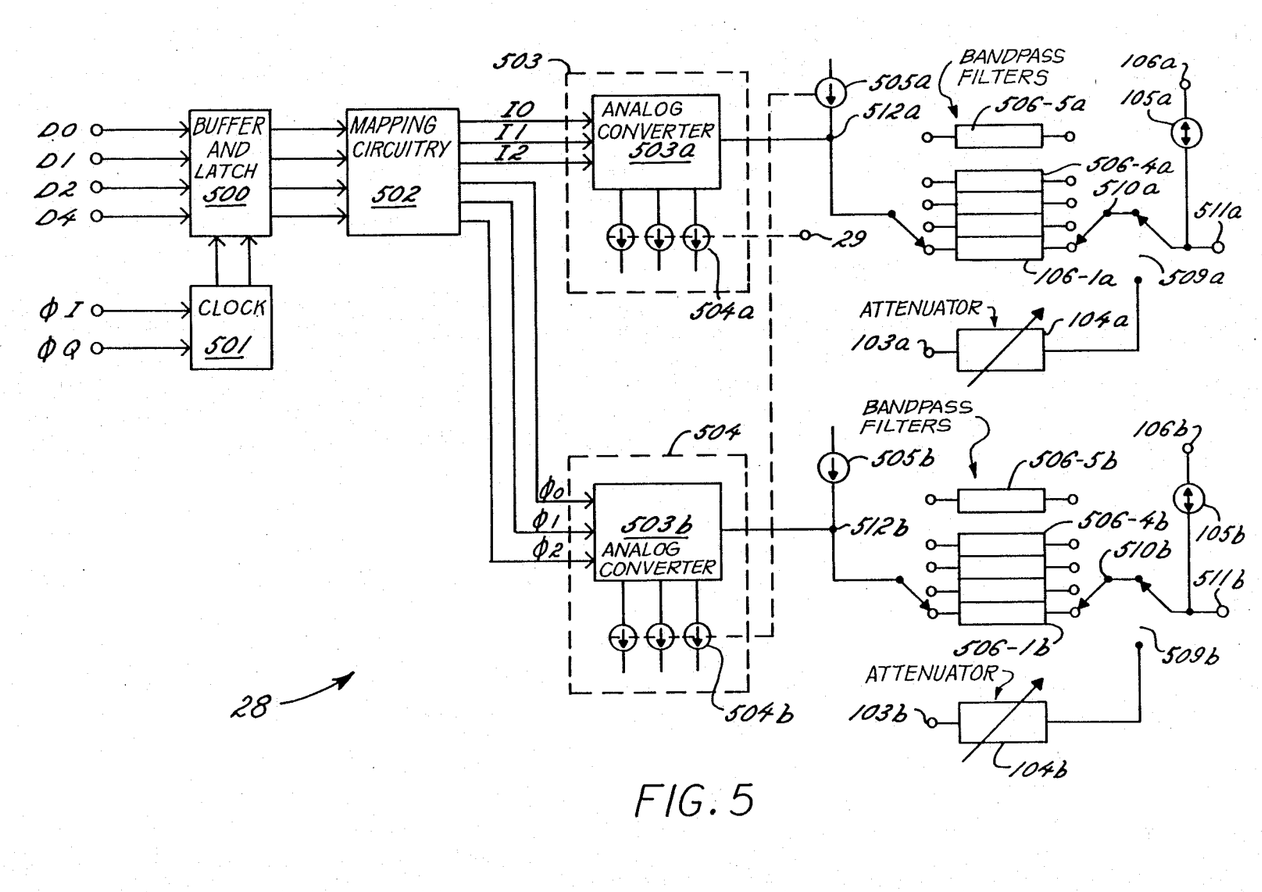
FIG. 5 is a block diagram of one embodiment of a baseband manipulation circuit 28 of FIG. 3 which is constructed in accordance with the teachings of this invention.

One key feature of the signal generator of this invention is the ability to generate wideband and precise modulation. The main components responsible for this performance are the wideband and linear vector (or "IQ") modulator 27 of FIGS. 3 and 4, and baseband manipulation circuitry 28 of FIG. 3. A block diagram of one embodiment of baseband manipulation circuitry 28 constructed in accordance the teachings of this invention is shown in FIG. 5. The main function of baseband manipulation circuitry 28 is to provide the I and Q drive levels to vector modulator 27 (FIGS. 3 and 4). The two modulations provided are digital modulation and vector modulation.

When digital modulation is selected, the user specifies a modulation format. The following are examples of suitable digital formats:
(1) BPSK (Binary Phase-Shift Keying)
(2) QPSK (QuadriPhase-Shift Keying)
(3) 8PSK
(4) 16QAM (Quadrature Amplitude Modulation)
(5) 64QAM In addition, burst modulation can be selected simultaneously with the first three formats. In Burst mode, the user can turn off the signal by applying a high logic level to the burst input terminal, independent of the states of the other data lines. This is useful for those who wish to simulate TDMA signals where transmission of data occurs in bursts, or for those interested in generating coded radar pulses.

One can also choose scalar modulation in conjunction with any of the above formats. This allows linear control of the amplitude of the output signal on terminal 34 (FIG. 3). In other words, the output signal amplitude is proportional to the analog voltage applied to scalar modulation input terminal 28 (FIGS. 3 and 5). For example, when the scalar modulation input voltage is zero, there is no output signal, and when the scalar modulation input is 1 volt, the output signal is at its full scale level. This feature is useful for those interested in testing ALC circuits in receivers, or performing amplitude-fade simulations.

Figures 6A, 6B, 6C:
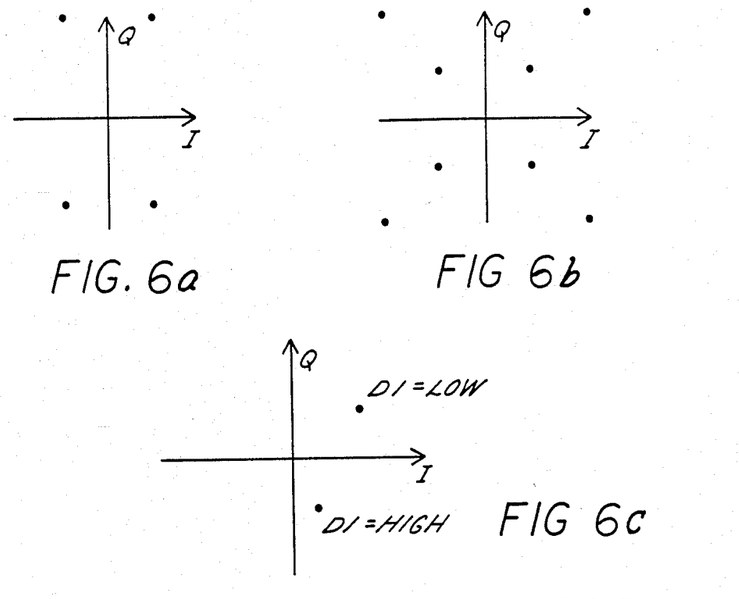
FIGS. 6a through 6c are graphs depicting certain modulation patterns available from a signal generator constructed in accordance with the teachings of this invention.

Besides the standard digital modulation formats, the one embodiment of the digital baseband circuitry 28 provides the signal generator of this invention with certain novel operating functions:
(1) I<Q: This allows the user to change the gain of the I channel relative to that of the Q channel as depicted in the graph of FIG. 6a.
(2) ALTERNATE LEVEL: This allows the user to specify a second power level, and the output level can be switched from one level to the other at high speed with one data line as depicted in the graph of FIG. 6b.
(3) 2-STATE: This allows the user to specify two arbitrary states in the I/Q plane, and the output can be switched from one state to another at high speed with one data line as depicted in the graph of FIG. 6c.
(4) ADD CARRIER LEAKAGE: This allows the user to add a controlled amount of carrier to the modulated output signal. This is useful when testing carrier recovery circuits in radios.
(5) ADD QUADRATURE ERROR: This allows the user to introduce quadrature error to the output signal. This is useful for simulating non-ideal modulators.
(6) PRBS GENERATOR: An internal pseudorandom bit sequence (PRBS) generator allows the user to generate digitally modulated signals without needing an external data generator.
(7) 2-CLOCK SYNCHRONOUS MODE: In this mode the I and the Q channels can have different clocking signals. This makes it easy to simulate Offset QPSK signals, or other modulations where the I and the Q channels operate at different clock rates.

Referring to FIG. 5, baseband manipulation circuitry 28 includes input leads D0 through D3, which receive input data used for digital modulation and burst modulation. The definition of which input leads D0 through D3 serve which function is performed by mapping circuitry 502. Buffer and latch circuitry 500 serves to buffer and store the information received on input leads D0 through D3 until ready for use by mapping circuitry 502. Buffer and latch circuitry 500 is controlled by clock circuitry 501, which receives input clock signals $\phi I$ and $\phi Q$. Clock circuitry 501 causes buffer and latch circuitry 500 to operate on input signals D0 through D3 in response to one or both of clock signals $\phi I$ and $\phi I$.

Mapping circuitry 502 receives input signals from buffer and latch circuitry 500 and forms the appropriate input signals to digital to analog converters 503 and 504. These input signals I0 through I2 and Q0 through Q2 are determined in response to the desired modulation format selected by the user on input leads D0 through D3. Singlas I0 through I2 and Q0 through Q2 causes high speed switches 503a and 503b to select which current sources 504a and 504b are to be connected to nodes 512a and 512b, respectively. Current from these selected current sources is added to the currents from current sources 505a and 505b, respectively, in order to provide the proper current drive level for the modulation type and state specified by the input signals applied to input leads D0 through D3.

If desired, current levels from current sources 504a, 504b, 505a and 505b are varied in response to a scalar input signal applied to input terminal 29. In this case, the actual current level provided at nodes 512a and 512b is equal to the currents provided by current sources 504a, 505a, and 504b, 505b, scaled by a factor specified by the signal applied to scalar input terminal 29. Switches 509a, 509b select whether digital or analog input signals are to provide modulation information via leads 511a and 511b to modulators 102a and 102b of vector modulator 27 (FIG. 4). The switch position shown in FIG. 5 selects the digital input signal as the modulation source, while when switches 509a and 509b are switched to the opposite position, analog input signals on input terminals 103a, 103b are applied via analog attenuators 104a, 104b to leads 511a and 511b, respectively, which are then applied to I modulator 102a and Q modulator 102b of FIG. 4.

When using digital information to vector modulate the carrier signal, gains to I modulator 102a and Q modulator 102b are altered by adjusting the levels of current sources 504a, 505a, and 504b, 505b, respectively, in order to compensate for gain differences between the I and Q channels of the vector modulator. This allows the modulated signal to be as accurate as possible. Conversely, when analog input signals are used to vector modulate the carrier frequency, the levels of the analog input signals received on input terminals 103a and 103b are adjusted by analog attenuators 104a and 104b, respectively, thereby compensating for the gain differences between the I and Q channel of the vector modulator.

When digital modulation is selected, a selected one of baseband filters 506-1a through 506-5a and 506-1b through 506-5b is switched to the I and Q channel, respectively in order to limit the spectrum of the baseband signals. This is necessary because the baseband signals have very fast switching times (typically less than 1 ns) and therefore occupy very wide bandwidths. Which one of the internal filters 506-1a through 506-4a; 506-1b through 506-4b gets switched in depends on the carrier frequency chosen. At low carrier frequencies, the filters are selected to have a narrower bandwidth than at high carrier frequencies so that aliasing is not a problem in the output signal. There is also provision for the user to provide their own baseband filters 506-5a, 506-5b so the user can shape the spectrum as desired.

In vector modulation, the user provides analog I and Q baseband signals to the vector inputs, and the signal generator of this invention acts as an ideal vector modulator at the selected carrier frequency. Internal calibration routines insure that the modulator has low offsets, that the two channels are balanced (equal gain) and that the quadrature is set correctly. In this mode the modulation bandwidth specified is DC to 350 MHz, resulting in a double-sided RF bandwidth of up to 700 MHz. This permits very wideband complex modulation and makes it possible to simulate signals like radar chirps, MSK (minimum shift-keying) signals, etc.

When used with a pair of Arbitrary Waveform Synthesizers (such as the HP 8870 manufactured by Hewlett-Packard) the signal generator of this invention provides exceptional signal simulation capabilities; any signal within the specified modulation bandwidth can be simulated as long as the signal can be broken down into its I and Q components. Or if one wished to duplicate a RF signal, one needs only to vector-demodulate it, capture the I and Q components with a waveform recorder, modify the data if necessary on a computer, and send the data to the HP 8870 devices which in turn vector-modulate the signal generator of this invention.

One of the most important requirements of digital baseband manipulation circuitry 28 of FIG. 5 as a fast current-switching device 503a, 503b is to provide accurate levels to drive the vector modulator at high data rates. In FIG. 5, precision digital to analog converters (DACs) 504a, 504b are shown which provide level accuracy, and a fast current-switching device 503c, 503b is used on the I and Q channels, respectively, to allow rapid transition from level to level by switching the DAC generated currents on and off. For instance to generate BPSK signals, the I-channel baseband can have one of two levels, corresponding to whether a current is switched on or off by high speed switch 503a into node 512a of FIG. 5. By connecting more than one switch 504a, 504b in parallel, it is possible to generate more than two levels, and therefore generate more complex modulation. For example, 16QAM requires four levels per channel, and 64QAM eight.

Figure 7:
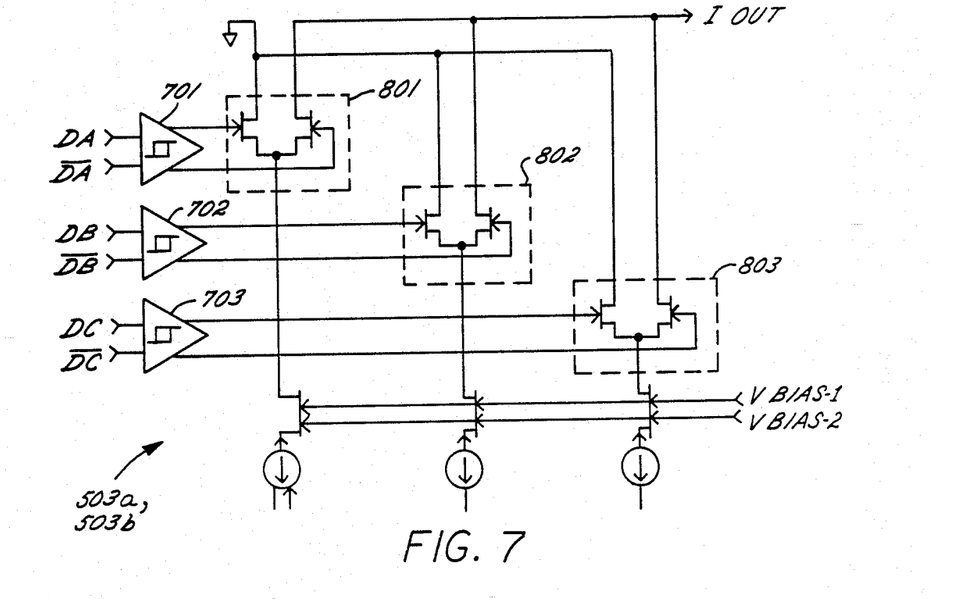
FIG. 7 is a schematic diagram of one embodiment of a high speed gallium arsenide switch suitable for use as switch 503a and 503b of FIG. 5.

FIG. 7 is a schematic diagram of one embodiment of a circuit suitable for use as high speed switches 503a and 503b of FIG. 5 which are fabricated in gallium arsenide. There are three Schmitt triggers 701, 702, 703 driving three differential current switches 801, 802, 803, respectively. Schmitt triggers 701, 702, 703 require about 0.5 volt swing on their input leads, and provide a 3-volt swing on their output leads to drive differential current switches 801, 802, 803. The range of currents for each switch 801, 802, 803 is zero to 20 mA.

Figure 8:
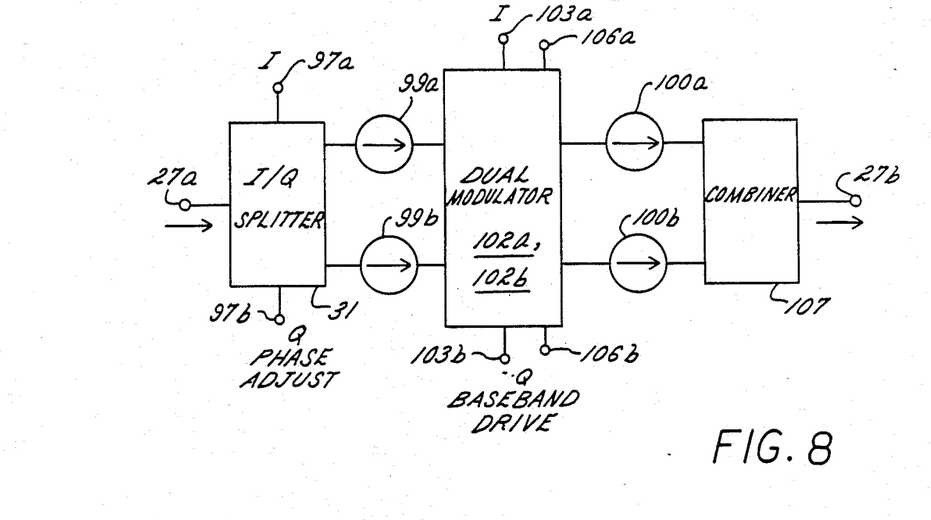
FIG. 8 is a block diagram of the construction of one embodiment of an I/Q modulator in accordance with the teachings of this invention.

In one embodiment, vector modulator 27 of FIG. 4 is constructed as three circuits interconnected by isolators as shown on the block diagram of FIG. 8. The function of the modulator is to generate very accurate I and Q signals when driven by the digital baseband circuits. Isolators 99a, 99b, 100a, 100b are used between the individual microcircuit assemblies to insure extremely low crosstalk between the I and Q channels.

Figure 9:
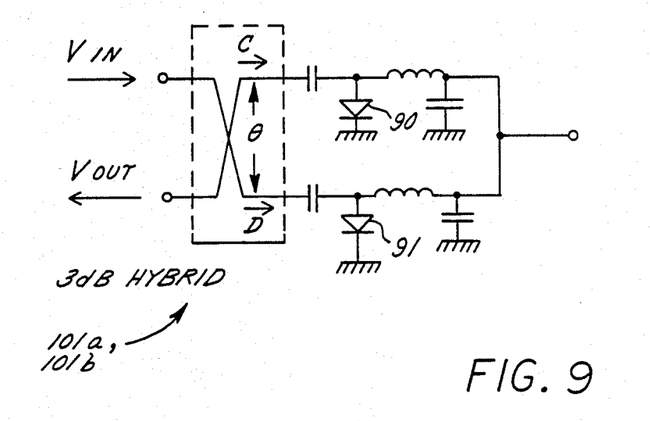
FIG. 9 is a schematic diagram of one embodiment of microwave phase shifters 101a and 101b of FIG. 4.

I/Q splitter 31 (FIGS. 4, 8) takes the 8.0 GHz IF signal from input lead 27 and generates two equal amplitude, phase quadrature signals I and Q. These high level (+12dBm) phase quadrature signals drive the local oscillator ports of I and Q modulators 102a, 102b. Included are voltage adjustable phase shift networks 101a, 101b. Approximately 25 degrees of phase adjust range is obtained for a −4 to −12 volt tuning range. During calibration these phase shifter networks 101a, 101b permit exact quadrature to be obtained even though the individual isolators 99a, 99b, 100a, 100b or modulators 102a, 102b are not perfectly phase matched. In one embodiment, I/Q splitter 31 is a 90° hybrid constructed as a four wire line interdigitated type built on a 25 mil thick sapphire substrate. Phase shifters 101a, 101b are built as shown on schematic diagram of FIG. 9 using the same type hybrid but with GaAs tuning varactors 90, 91 connected to ground on the coupled and direct output ports. When built this way the resultant signal from the "isolated" port of the hybrid is simply equal to the reflection coefficient (plus a fixed phase offset) of the varactor. As the DC voltage on the varactor is changed a corresponding change in capacitance occurs. This results in a change in the angle of the reflection coefficient (rho). since the magnitude of rho is unity the nex result is a phase change in the output signal.

Dual modulator 102a, 102b of FIG. 8 provides wideband (e.g., 0 to 350 MHz) modulation to the two quadrature signals I and Q from I/Q splitter 31. Dual modulator 102a, 102b also include low pass filters (not shown) on I and Q baseband modulation input leads 103a and 103b, respectively. These filters provide rejection of the 8.0 GHz IF signal at baseband input ports 103a, 103b and provide a 50 ohm or "37 matched" termination to the modulator IF port at 8 GHz. This matching prevents abnormal modulator behavior over the full modulation bandwidth at 8.0 GHz. By operating the modulator at a carrier frequency of 8 GHz the 350 MHz modulation rate represents less than a 10% bandwidth. This makes it possible to produce very linear modulation with low crosstalk.

The modulator uses double balanced mixers that were chosen to have the following attributes.
1. A wideband DC coupled I-port with flat frequency response.
2. Excellent L-R isolation (typically 40 dB) and low DC offset.
3. Excellent linearity for IF drive levels up to ±0.1 volts.
4. Low VSWR on the mixer I-port from DC to 350 MHz (typically impedance of 50 ohms)
5. Low AM to PM conversion.

Combiner 107 takes the two modulated signals and adds them together to produce a single vector. Low pass filters (not shown) in each path prevent harmonics (16, 24, 32 GHz etc.) generated by dual modulator 102a, 102b from appearing at output port 27b, thereby preventing spurious signals in the output signal on output lead 27b. These low pass filters also prevent coupling between modulators 102a and 102b, thereby eliminating crosstalk between the I and Q signals.

In-phase (0 degree) signal addition is done with a resistively loaded reactive power combiner 107 (FIG. 4). This type of combiner provides minimum loss (3 dB), high isolation and excellent input/output VSWR. These attributes are essential for flat amplitude/phase response and low crosstalk. In one embodiment, output mixer 33a (FIG. 3) takes the 8 GHz modulated signal from the vector modulator and downconverts it to the 10 to 3,000 MHz range. The LO covers the frequency range of 8.01 to 11.0 GHz.

Output mixer 33 uses a double balanced mixer 33a (FIG. 3) that was carefully chosen to have a wideband IF response (10-3350 MHz), excellent amplitude/phase flatness and low distortion. A diplexer circuit on the mixer I-port provides three important function.
1. Rejection of signals above 5 GHz to the output port.
2. Provides a 50 ohm termination to the mixer I-port at 8 GHz.
3. Provides reactive matching at 3 GHz to improve conversion loss flatness and I-port '37 match".

Output amplifier 35 (FIG. 3) is a wideband, ultra-linear, low noise, amplifier with flat frequency response and good input and output match. The amplifier linearity affects the DC vector accuracy of the instrument. The amplifier frequency response and match cause dynamic crosstalk or AM to PM conversion. The noise figure sets the instrument noise floor.

All patent applications are herein incorporated by reference to the same extent as if each individual patent application was specifically and individually indicated to be incorporated by reference. The invention now being fully described, it will be apparent to one of ordinary skill in the art that may changes and modifications can be made thereto without departing from the spirit or scope of the appended claims.

What is claimed is:
1. A signal generator comprising: means for receiving an input signal indicating a desired output frequency within a broad range of possible output frequencies;
means for providing a first signal;
means for vector modulating said first signal;
means for providing a second signal having a desired frequency with a broad range of possible frequencies, said second signal frequency being determined in response to said input signal indicating a desired output frequency; and
means for mixing said vector modulated first signal and said second signal, providing a vector modulated output signal having said desired output frequency.

2. A signal generator as in claim 1 which further comprises:
means for receiving digital signals for vector modulating said first signal;
means for receiving analog signals for vector modulating said first signal; and
switch means for selecting either said digital signals or said analog signals for application to said means for vector modulating.

3. A signal generator comprising:
means for providing a first signal;
means for vector modulating said first signal;
means for providing a second signal having a desired frequency within a range of possible frequencies;
means for mixing said vector modulated first signal and said second signal, providing a vector modulated output signal having an output frequency within a range of possible output frequencies;
means for receiving digital signals for vector modulating said first signal;
means for receiving analog signals for vector modulating said first signal; and
switch means for selecting either said digital signals or said analog signals for application to said means for vector modulating.

4. A signal generator as in claims 2 or 3 which further comprises means for controlling the gain of said analog signal, thereby controlling the level of modulation of said output signal.

5. A signal generator as in claim 4 wherein said means for controlling the gain operates in response to an analysis of said output signal.

6. A signal generator as in claim 1 which further comprises means for controlling carrier leakage of said output signal.

7. A signal generator comprising:
means for providing a first signal;
means for vector modulating said first signal;
means for providing a second signal having a desired frequency within a range of possible frequencies;
means for mixing said vector modulated first signal and said second signal, providing a vector modulated output signal having an output frequency within a range of possible output frequencies; and
means for controlling carrier leakage of said output signal.

8. A signal generator as in claims 6 or 7 wherein said means for controlling carrier leakage comprises means for adding a DC level to said analog signal.

9. A signal generator as in claims 6 or 7 wherein said means for controlling carrier leakage operates in response to an analysis of said output signal.

10. A signal generator as in claim 8 wherein said means for controlling carrier leakage operates in response to an analysis of said output signal.

11. A signal generator as in claim 1 further comprising means for adjusting the phase of the vector components of said output signal.

12. A signal generator comprising:
means for providing a first signal;
means for vector modulating said first signal;
means for providing a second signal having a desired frequency within a range of possible frequencies;
means for mixing said vector modulated first signal and said second signal, providing a vector modulated output signal having an output frequency within a range of possible output frequencies; and
means for adjusting the phase of the vector components of said output signal.

13. A signal generator as in claims 11 or 12 wherein said means for adjusting the phase operates in response to an analysis of said output signal.

14. An IQ modulator comprising:
an input port for receiving an input carrier signal;
an output port for providing an IQ modulated output signal;
phase splitter means for receiving said input carrier signal and providing an I carrier component and a Q carrier component;
I phase adjustment means for adjusting the phase of said I carrier component;
Q phase adjustment means for adjusting the phase of said Q carrier component;
an I modulation data input terminal for receiving I modulation input data;
a Q modulation data input terminal for receiving Q modulation input data;
I modulation data gain adjustment means for receiving said I modulation input data and providing a gain adjusted I modulation data signal;
Q modulation data gain adjustment means for receiving said Q modulation input data and providing a gain adjusted Q modulation data signal;
I modulation means for modulating said I carrier component with said gain adjusted I modulation data signal;
Q modulation means for modulating said Q carrier component with said gain adjusted Q modulation data signal;
I carrier leakage adjustment means for providing a DC level to said gain adjusted I modulation data signal;
Q carrier leakage adjustment means for providing a DC level to said gain adjusted Q modulation data signal; and
means for combining the output signals from said I modulation means and said Q modulation means and providing a combined signal on said output port.

15. An IQ modulator as in claim 14 wherein said phase splitter means comprises a 90° hybrid.

16. An IQ modulator as in claim 14 wherein said I phase adjustment means and said Q phase adjustment means each comprise phase shifters.

17. An IQ modulator as in claim 14 wherein said I modulation data gain adjustment means and said Q modulation data gain adjustment means each comprise adjustable attenuators.

18. An IQ modulator as in claim 14 wherein said I carrier leakage adjustment means and said Q carrier leakage adjustment means each comprise a digital to analog converter.

19. An IQ modulator as in claim 14 further comprising baseband manipulation circuitry for controlling said I phase adjustment means, Q phase adjustment means, I modulation data gain adjustment means, Q modulation data gain adjustment means, I carrier leakage adjustment means, and Q carrier leakage adjustment means to provide said IQ modulated output signal having desired characteristics.

20. An IQ modulator as in claim 14 which further comprises:
an isolator connected between said phase splitter means and said I modulation means;
an isolator connected between said phase splitter means and said Q modulation means;
an isolator connected between said I modulation means and said means for combining; and
an isolator connected between said Q modulation means and said means for combining.

* * * * *